United States Patent [19]

Rantapuska et al.

[11] Patent Number: 4,917,775

[45] Date of Patent: Apr. 17, 1990

[54] METHOD FOR MEASURING AND ADJUSTING ELECTROCHEMICAL POTENTIAL AND/OR COMPONENT CONTENT IN THE PROCESS OF TREATING VALUABLE MATERIALS

[75] Inventors: Seppo V. Rantapuska, Espoo; Seppo O. Heimala, Pori, both of Finland

[73] Assignee: Outokumpu Oy, Helsinki, Finland

[21] Appl. No.: 47,498

[22] Filed: May 7, 1987

Related U.S. Application Data

[63] Continuation of Ser. No. 787,735, Oct. 15, 1985, abandoned.

[30] Foreign Application Priority Data

Oct. 30, 1984 [FI] Finland .................................. 844246

[51] Int. Cl.[4] .............................................. G01N 27/30

[52] U.S. Cl. .................................. 204/153.1; 204/402

[58] Field of Search ............... 204/1 T, 400, 402, 415, 204/416, 419

[56] References Cited

U.S. PATENT DOCUMENTS

| | | | |
|---|---|---|---|
| 2,918,420 | 12/1959 | Sabins | 204/402 X |
| 3,523,883 | 8/1970 | Waclajwik et al. | 204/402 |
| 3,766,022 | 10/1973 | Higashiyama et al. | 204/1 T |
| 3,779,265 | 12/1973 | Hart | 204/1 T X |
| 3,883,421 | 5/1975 | Cutting et al. | 204/1 T X |
| 3,892,833 | 7/1975 | Hattori et al. | 204/1 T X |
| 4,033,830 | 7/1977 | Fletcher, III | 204/1 T |
| 4,059,406 | 11/1977 | Fleet | 204/412 X |
| 4,072,594 | 2/1978 | Outsuka et al. | 204/1 T X |
| 4,500,391 | 2/1985 | Schmidt et al. | 204/1 T |
| 4,566,949 | 1/1986 | Berger | 204/1 T |

*Primary Examiner*—Nam X. Nguyen

*Attorney, Agent, or Firm*—Brooks Haidt Haffner & Delahunty

[57] ABSTRACT

The invention relates to a method for measuring and adjusting electrochemical potential and/or component content in the process of treating valuable materials, when the valuable materials should be recovered either together or separately by aid of the values of the recovery range defined on the basis of electrochemical potential and component control. According to the invention, the measuring of electrochemical potential and/or component content is carried out by means of at least one electrode (4, 5), advantageously by means of a mineral electrode, so that in order to regulate the physicochemical state of the electrode and/or to remove the coating layer formed on the electrode surface and in order to protect the electrode, onto the electrode there is switched a supply voltage differing from the electrochemical balance potential of the electrode, which supply voltage is switched off before starting the measuring operation.

8 Claims, 3 Drawing Sheets

METHOD FOR MEASURING AND ADJUSTING ELECTROCHEMICAL POTENTIAL AND/OR COMPONENT CONTENT IN THE PROCESS OF TREATING VALUABLE MATERIALS

This application is a continuation of application Ser. No. 787,735, filed Oct. 15, 1985 abandoned.

The present invention relates to a method for measuring and adjusting electrochemical potential and/or component content in the process of treating valuable materials, when the desired conditions of the process are such that the valuable minerals can be advantageously recovered either together or separately, depending on the material to be treated.

The regulation of the treatment processes of valuable minerals is generally carried out with the aid of empirical parameters. This method of regulation is profitable with rich, high-quality materials with a relatively homogeneous composition, but the use of empirical parameters in connection with for example complex mineral compounds does not lead to an economically ideal result with respect to the recovery rate. In order to eliminate these drawbacks, various electrochemical, thermodynamical and physical methods have been tested. The employed methods, however, require detailed information of the behaviour and chemical nature of the various components in the different stages of the treatment process.

Figure 1:
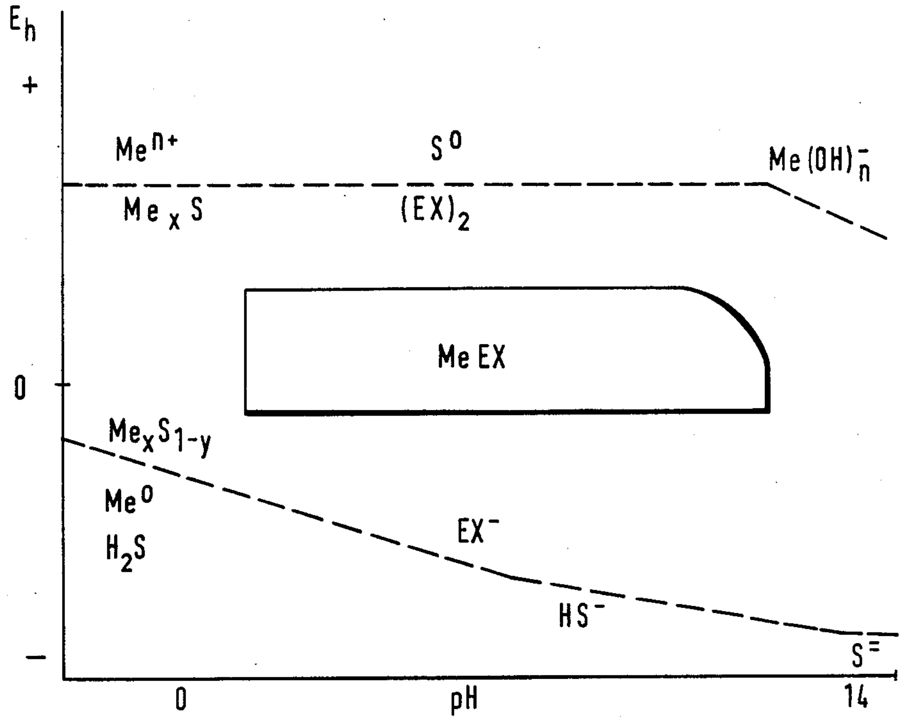

Let us observe an important process for treating valuable minerals, i.e. flotation, when the regulation is carried out with the aid of electrochemical potential. In the flotation of various minerals by means of collecting agents, the chemical nature of the flotation process changes according to the particular ore in question. In the flotation of sulphide ores, important factors—apart from electrochemical potential—are for instance the pH value during the flotation, as well as the content of the collecting agent. In order to achieve an ideal flotation result for valuable minerals, it is advantageous to be familiar with the $E_h$–pH system—formed by electrochemical potential and pH—created by the said minerals, which system is illustrated in the schematical diagram of FIG. 1. FIG. 1 shows the flotation range for the system Me-S-KEX-$H_2O$, when the large-scale formation of sulphate is kinetically prevented. Although the number of possible systems is very large, the principles for their treatment are similar. During grinding, the working spots are placed near the border $Me^o$/$Me_xS_{1-y}$, when metal bars and bullets are used. Thus the collecting agent $EX^-$ does not stick onto the surface of the metal sulphide MeS. While aerating with air in slurry, the electrochemical potential changes towards the anodic direction and enters the area where MeS forms a chemical compound, i.e. MeEX, together with the collecting agent. Thus the flotation ranges for various minerals can be defined, when a predetermined collecting agent with a given content is employed. Moreover, in order to achieve the desired degree of selectivity for the method, the desired flotation range must be reached in an easy and simple manner. Respectively, if several various minerals should be floated simultaneously in a co-concentrate, a specific, profitable flotation range in the $E_h$–pH system can be determined for each mineral, and thereafter the flotation can be carried out within the $E_h$–pH area which is common for all of the determined flotation ranges.

In flotation processes, as well as in precipitation and dissolution processes and in the so-called bacteria dissolution, where the electrochemical potential is a measurable parameter, the measuring operations are in the prior art generally carried out by means of a non-soluble platinum electrode. Electrodes made of various different mineral compounds have also been used in some research project. However, depending on the process in question, particularly organic additives, alkaline salts, sulphur, various arsenic compounds and for instance silica gel tend to form a coating layer on the surface of the electrode, which layer essentially disturbs the measuring of the true potential or content value, as well as the regulation of the process carried out on the basis of the measuring results. Furthermore, it is pointed out that even electrodes made of the same material may have differing potentials owing to for instance their manufacturing processes and consequently to their behaviour in the reaction. Differences in the potential are generaly unpredictably changing. Thus the location of the desired $E_h$–pH range can end up being totally devious from the advantageous range, in which case the recovery of valuable minerals from the treated materials becomes difficult and expensive.

The object of the present invention is to eliminate the drawbacks of the prior art and to realize a method wherein the recovery of valuable materials by means of measuring and/or adjusting electrochemical potential and possible additive content becomes simple and profitable so that the valuable materials can, when desired, be recovered either separately or in a group formed by several components.

According to the invention, the measuring of the electrochemical potential and/or of the content of the component added into the process or produced in the process is carried out by using an electrode which is suited for the conditions of the process. By employing for instance a mineral electrode which is advantageously manufactured of materials close to the components present in the process, or even of the same materials as the process components, it is possible to regulate the physicochemical state of the electrode and/or to reduce the formation of the harmful coating layer and simultaneously to improve the reaction balance between the measuring surface of the electrode and the surrounding material. Thus the measuring results of both the electrochemical potential and of the additive content will correspond to the real value of each quantity which is present and effective in the process.

While measuring the electrochemical potential, the formation of the coating layer formed by the collecting agent of the observed process can prevented by changing the voltage fed into the electrode in the various stages of the measuring operation. For example, while a reduction reaction is taking place on the electrode, a positive cleaning voltage is switched onto the electrode so that the electrode surface is electrochemically cleaned of all process reagents and additives. After the cleaning voltage, the voltage is changed towards the negative direction and a protective voltage is fed onto the electrode, the magnitude of which voltage as such depends on the compounds to be treated and on the general conditions of the process. After the said changes in the voltage, the voltage supply is switched off the electrode, so that the material surrounding the electrode is balanced with respect to the electrode. After sufficient balancing, the measuring operation is carried out by means of conventional technique, for example voltammetric methods. In connection with the measuring, it is simultaneously possible and advantageous to eliminate electrical disturbance signals from the measuring signals by aid of samping signals taken at given intervals. Moreover, the electrode surface can be advantageously abraded in a continuous, turbulent current in order to prevent the formation of the harmful coating layer. In a similar fashion, ultrasonic and/or mechanical cleaning can be employed in preventing the formation of the harmful coating layer.

Depending on the reaction taking place on the measuring electrode with respect to the surrounding material, the cleaning voltage fed into the electrode is chosen to be either negative or positive. During a reduction reaction on the electrode, a positive cleaning voltage is chosen so that, in order to achieve the protective voltage according to the method of the invention, the supply voltage is changed toward the negative direction with respect to the cleaning voltage, or towards the positive direction with respect to the measured potential value. During an oxidation reaction, on the other hand, the cleaning voltage of the method of the invention is chosen to be negative, and the supply voltage is reduced towards the negative direction with respect to the measured potential in order to create a protective voltage. Thus, during reduction the voltage is changed towards the anodic direction and during oxidation it is changed towards the cathodic direction. By employing a mineral electrode, the desired balance is re-established quickly and accurately, with special attention to the electrode reactions, after the cleaning process of the invention.

For the measuring of the additive and/or the reaction product according to the invention, an electrochemical method of measuring, advantageously based on voltammetrics, is also used. By employing an electrode manufactured of a material well suited for the process in question as the working electrode, with which the component reacts, the electric current and/or potential in the reaction can be measured for example by means of a method based on voltammetrics. In order to regulate the physicochemical state of the electrode and/or to prevent the formation of the coating layer also during the measuring of the additive, the electrode surface is cleaned in the same fashion as during the measuring of the electrochemical potential. Furthermore, during the measuring of the additive, the background current owing to the process conditions can also be advantageously eliminated, in which case the area of the created electric current peak is measured by subtracting the background current directed towards the electric current.

By employing the method of the present invention in the measuring and adjusting of electrochemical potential and/or component content, each valuable mineral to be treated can advantageously be brought, by aid of at least one measuring point, within the processing area where its recovery renders best results. If necessary, at one measuring point there can advantageously be placed several different electrodes for measuring electrochemical potential, various additives and/or reaction products. In the method of the invention, it is also possible to place the measuring electrodes at various stages of the process, so that the adjusting may also be carried out separately at each measuring point. In that case the measuring results, i.e. the potential differences indicated by the various minerals, can advantageously be directly interpreted into concentrations of various components, for instance of thiosulphates and cyanides, even if the system comprises a few disturbing factors like those of the prior art. Thus the measuring and adjusting can be carried out continuously both at an individual measuring point and in the various stages of the process to be regulated.

Figure 2:
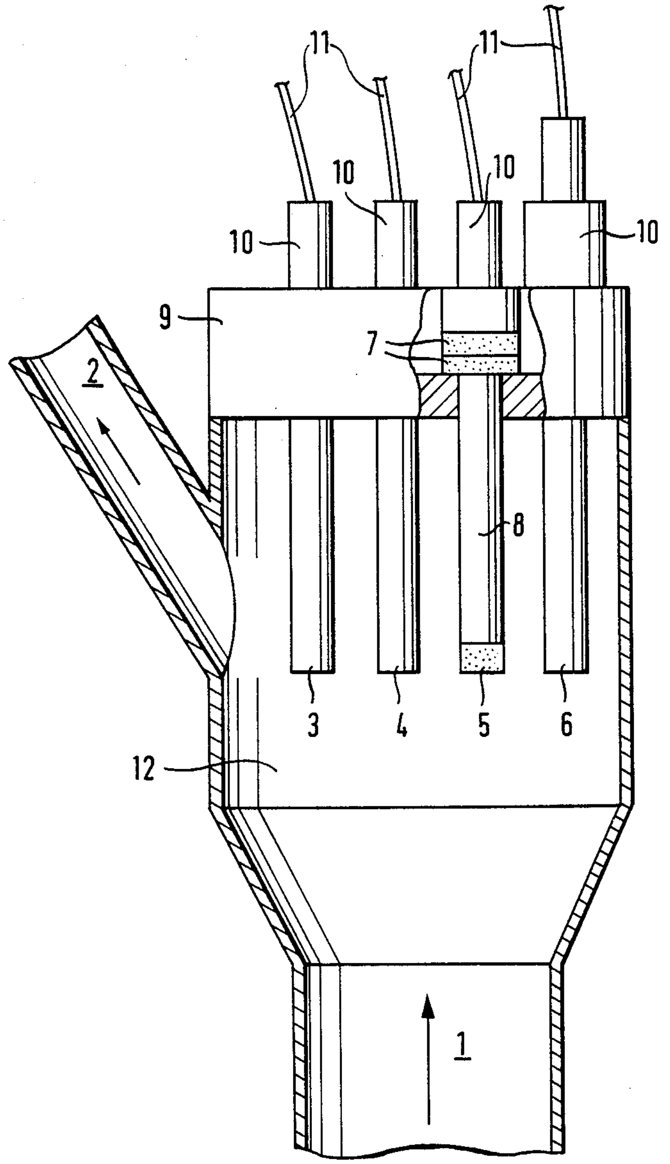
Figure 3:
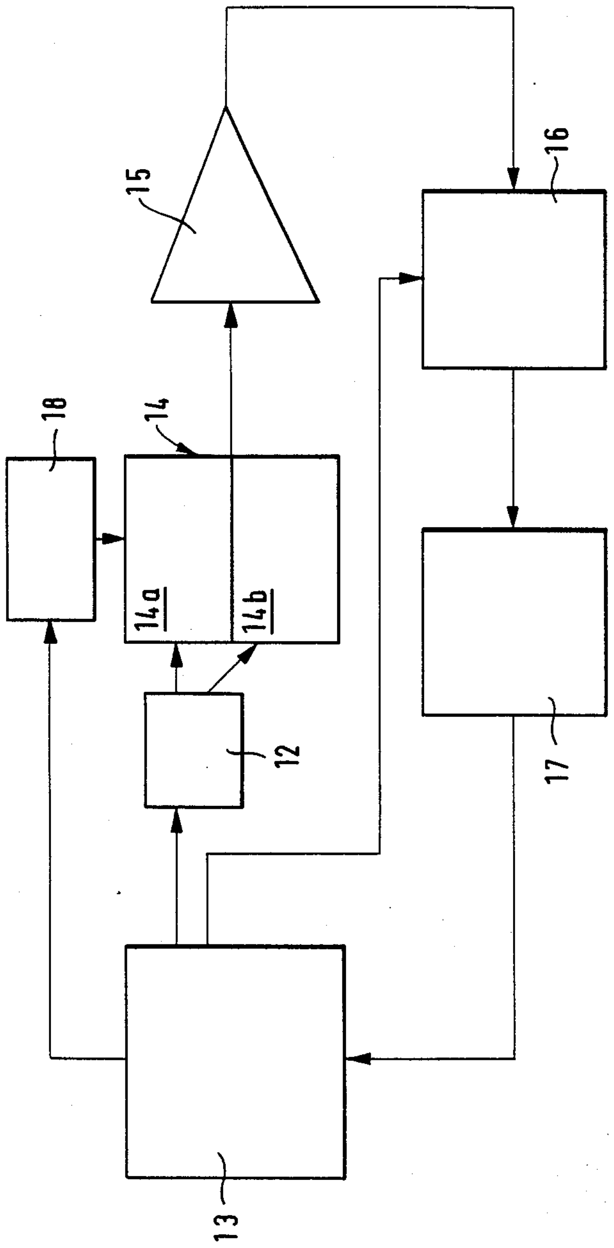

In the following the invention is explained with reference to the appended drawings, where FIG. 1 is a schematical illustration of the diagram formed by the electrochemical potential $E_h$ and pH, where the stability range between the mineral and the additive component is indicated, FIG. 2 is a schematical illustration of an apparatus according to a preferred embodiment of the invention; the apparatus designed for measuring electrochemical potential and additive component content is seen from the side in partial cross-section, and FIG. 3 is a schematical illustration of the operation of the apparatus of FIG. 2.

FIG. 1 has already been discussed in connection with the description of the prior art.

According to FIG. 2, the material to be measured, which is advantageously slurry, is conducted into the measuring cell 12 through the inlet pipe 1. The operation of the measuring cell 12 is based on voltammetrics, so that the material gets in touch with the counter electrode 3 and the reference electrode 6, as well as with the measuring electrodes proper 4, 5. The electrode 4 for measuring electrochemical potential is a mineral electrode and is profitably manufactured of for instance nickel sulphide. The electrode for measuring the additive also is a mineral electrode and is profitably manufactured of for instance copper sulphide. All of the electrodes 3, 4, 5 and 6 are attached to the cover 9 of the measuring cell 12 and further, by means of the electric adapters 10 and the electric conductors 11, to the electronic unit controlling the measuring cell 12.

Because of the danger that a coating layer could be formed on the electrode surfaces, the measuring electrode 5 is provided with an ultrasonic resonator 8 and ultrasonic crystals 7 for generating ultrasound (FIG. 2). It is possible to provide the other electrodes with respective equipment for generating ultrasound as well.

After the measuring operations, the material is conducted out of the measuring cell 12 via the outlet pipe 2. On the basis of the received measuring results, the process is adjusted by employing for instance the apparatus of the preferred embodiment illustrated in FIG. 3.

According to FIG. 3, from the electrodes 3, 4 and 5 of the measuring cell 12, the signals are conducted from the processing unit 14 into data processing 13 through the amplifier 15, the S/H circuit 16 and the analog/digital modulator 17. If necessary, the elimination of disturbance signals is carried out in the S/H circuit 16. In the data processing unit 13, the process parameter values obtained by aid of the measuring cell 12 are compared to previously known processing values. On the basis of the comparison, the processing unit 14 is adjusted by means of the regulating device 18.

From the appended examples it is apparent that the method of the invention can be applied to various processes—flotation, dissolution and precipitation—where electrochemical potential is used as one of the process parameters. Consequently, the number of the valuable minerals suited to be measured according to the method of the present invention is large; in the prior art there are developed several different treatment processes based on electrochemical potential, but in these processes only minor attention has been paid to the measuring operation itself, for example by way of choosing the measuring electrodes. Furthermore, the method of the invention allows for the use of other new methods such as the so-called molten temperature methods, which have been impossible to realize so far owing to regulation and controlling difficulties.

EXAMPLE 1

According to one preferred embodiment of the invention, a solution residue from high-grade nickel matte which was rich in copper sulphide ($Cu_{2-x}S$) and contained 10,5% by weight nickel sulphide, $Ni_xS$, was dissoluted in an autoclave in the temperature of 140° C. by regulating the air fed into the process on the basis of the electrochemical redox potential measured in the autoclave. The redox potential, which was measured by a mineral electrode manufactured of copper sulphide, $Cu_{2-x}S$, was adjusted for the duration of the whole dissolution process at $+510\pm5$ mV $E_h$, in which case the air supply into the dissolution electrode could also be profitably adjusted. After a three-hour selective dissolution process, the nickel concentration in the treated solution residue was 0.35% by weight.

Before measuring the electrochemical redox potential, in between the separate measuring operations, a negative cleaning voltage was supplied to the measuring electrode; after an advantageous duration, i.e. 10 s the voltage was changed into a more positive protective voltage for the duration of 5 s. Thereafter the voltage supply into the measuring electrode was switched off the circuit and after a balancing period, 40 s, the measuring of the electrochemical potential was carried out. According to the obtained measuring value of the redox potential, the air supply was adjusted so that the redox potential remained in the desired value. In the dissolution process of the example, the cleaning and protective voltages of the electrode were chosen towards the cathodic direction with respect to the employed redox potential. In a reference experiment which was carried out according to prior art methods, where the method of the invention was not applied, the nickel content of the treated solution residue was 4,2% by weight. Thus the nickel content of the solution residue treated according to the method of the present invention was only about 8% of the nickel content of the solution residue treated according to prior art methods.

EXAMPLE 2

The method of the invention was applied for cementing cobalt from a neutral solution received from a zinc refinery; the cementing was carried out by using an arsenic compound and zinc powder. Now the zinc power supply was regulated on the basis of electrochemical measurements carried out by means of the measuring electrode, which was an $Co_xAs$ electrode. By maintaining the electrochemical potential in $-547\pm$ mV SCE, the amount of the needed zinc powder was only 8% larger than with the stoichiometric value, while the cobalt content of the solution was reduced from 85 mg/l to 0.5 mg/l. The employed cleaning and protective voltages were chosen towards the anodic direction with respect to the electrochemical potential. In connection with the cleaning of the electrode, the supply voltage was changed into the positive direction in order to protect the electrode. While the neutral solution from a zinc refinery was treated according to prior art methods in order to reduce the cobalt content in respective process circumstances, the amount of the needed zinc powder was 65% larger than with the stoichiometric value. Thus the amount of the extra zinc powder needed in the process was nearly 8-fold compared to the amount of zinc powder needed in the process of the invention.

EXAMPLE 3

The method of the invention was employed in flotating copper sulphide mineral and nickel sulphide mineral, while the measuring electrodes were manufactured of copper sulphide, chalcopyrite and pentlandite minerals. In order to enable the separation of the minerals from each other, the process pH must be increased for example by aid of $Ca(OH)_2$ simultaneously as for instance dextrine is added into the slurry in order to press down the nickel pentlandite and to flotate the copper mineral. By employing the method of the invention the process was controlled by extra additions of $Ca(OH)_2$, dextrine, xanthate and air so that the potential of the chalcopyrite electrode remained within the sticking range of xanthate, and that the potential of the pentlandite electrode was 50 mV more negative than the potential required by the reaction between pentlandite and xanthate. The said potentials can be easily defined for example on the basis of generally known $E_h$-pH diagrams. The xanthate content of the slurry was maintained in 6 mg/l by aid of a copper sulphide electrode. In order to create a protective voltage after the cleaning voltage, the supply voltage was changed towards the negative direction. The final product from the process was copper concetrate with a nickel content of 0,41% by weight and nickel concentrate with a copper content of 0,27% by weight.

When a respective flotation was carried out according to prior art methods, so that a non-soluble platinum electrode was used—in which case the harmful coating layer was not removed, nor was its formation prevented—in the final product the nickel content of the copper concentrate was 1,2% by weight and the copper content of the nickel concentrate was 0,96% by weight, while the recovery rate in the prior art process and in the process of the present invention was economically equal. Thus the residue contents in the concentrates received from the process of the present invention are remarkably lower than in respective concentrates received from prior art processes.

We claim:

1. A method for measuring and adjusting electrochemical potential and/or component content in a slurry in the process of treating valuable materials in slurry form when the valuable materials are recovered either together or separately in response to recovery range values defined on the basis of electrochemical potential and component content in said slurry, comprising measuring of electrochemical potential and/or component content by means of at least one electrode made of a mineral material similar to or the same as a main component of the slurry to be controlled and, in order to keep the electrode similar to the slurry component and in order to protect the electrode, switching onto the electrode a supply voltage differing from a previously measured electrochemical potential and switching off the supply voltage before starting the measuring operation.

2. The method of claim 1, wherein the measuring of electrochemical potential and/or additive content is carried out by means of at least one mineral electrode.

3. The method of claim 1 or 2 wherein after regulating the stoichiometry and semiconductor forces in the electrode surface to keep the electrode similar to said slurry component the supply voltage is changed toward a known energy state on the surface of the material in order to protect the electrode.

4. The method of claim 1 or 2 wherein while a reduction takes place on the electrode the supply voltage is changed towards the anodic direction in order to protect the electrode in between the measuring operation.

5. The method of claim 1 or 2, wherein while an oxidation reaction takes place on the electrode the supply voltage is changed towards the cathodic direction in order to protect the electrode in between the measuring operations.

6. The method of claim 1 or 2, wherein the measuring operations of electrochemical potential and additive content are both carried out by means of separate measuring electrodes.

7. The method of claim 4, wherein measuring and adjusting of electrochemical potential and additive content are carried out at separate process stages which are at least electrically interconnected.

8. The method of claim 1, wherein the differences in the electrochemical potentials obtained for the materials are utilized in determining the component contents.

* * * * *